(12) United States Patent
Eaton

(10) Patent No.: US 7,699,240 B1
(45) Date of Patent: Apr. 20, 2010

(54) MULTIPLE LIQUID AND SOLIDS DISPENSER APPARATUS AND METHOD

(76) Inventor: Mark Eaton, 143 Casa Loma Cir., Georgetown, TX (US) 78628

( * ) Notice: Subject to any disclaimer, the term of this patent is extended or adjusted under 35 U.S.C. 154(b) by 307 days.

(21) Appl. No.: 11/385,538

(22) Filed: Mar. 21, 2006

(51) Int. Cl.
 *A01G 25/09* (2006.01)
(52) U.S. Cl. .......................... 239/1; 239/662; 239/663; 239/289; 239/145; 239/326; 222/187
(58) Field of Classification Search ................ 239/662, 239/654, 289, 663, 145, 34–60, 1, 326; 47/1.5; 401/41
See application file for complete search history.

(56) References Cited

U.S. PATENT DOCUMENTS

| | | | | |
|---|---|---|---|---|
| 2,659,627 A | * | 11/1953 | McConnell | ................ 239/316 |
| 2,661,871 A | * | 12/1953 | Huenergardt | ............... 222/129 |
| 4,171,169 A | * | 10/1979 | Williams | ...................... 401/41 |
| 4,513,528 A | * | 4/1985 | Dale | ............................. 47/1.5 |
| 4,689,249 A | * | 8/1987 | Thygesen | ................... 427/180 |
| 4,771,734 A | * | 9/1988 | Blicher | ..................... 119/51.11 |
| 4,798,325 A | * | 1/1989 | Block | ......................... 239/663 |
| 4,949,906 A | * | 8/1990 | Godwin | ..................... 239/663 |
| 4,989,547 A | * | 2/1991 | Eaton | ...................... 119/51.11 |
| 5,236,507 A | * | 8/1993 | Brown | ......................... 118/707 |
| 5,333,795 A | * | 8/1994 | Jessen | ......................... 239/663 |
| 6,550,689 B1 | * | 4/2003 | Hoyes et al. | ................... 239/1 |

* cited by examiner

*Primary Examiner*—Dinh Q Nguyen
(74) *Attorney, Agent, or Firm*—J. Nevin Shaffer, Jr.

(57) ABSTRACT

A multiple liquid and solids dispenser apparatus and method includes a solids dispenser for holding and dispensing solids. A liquid dispenser is connected to the solids dispenser and the liquid dispenser contains more than one liquid and is positioned so as to dispense the more than one liquid on the solid or not on the solid as desired.

9 Claims, 3 Drawing Sheets

MULTIPLE LIQUID AND SOLIDS DISPENSER APPARATUS AND METHOD

FIELD OF THE INVENTION

This invention relates to a multiple liquid and solids dispenser apparatus and method. In one embodiment in particular, the invention relates to a multiple liquid and solids dispenser apparatus including a solids dispenser for holding and dispensing solids. A liquid dispenser is connected to the solids dispenser and the liquid dispenser contains more than one liquid and is positioned so as to dispense the more than one liquid on the solid or not on the solid as desired.

BACKGROUND OF THE INVENTION

A variety of situations and circumstances exist wherein it is useful to dispense solids and liquids at the same time. Gravel and water, asphalt and tar or oil, food and scent/chemicals are a few examples. For the purposes of illustration and by way of example only and not by limitation, deer hunters use feeders to lure deer. Applicant's Liquid and Solid Dispenser Apparatus and Method (U.S. Pat. No. 4,989,547), incorporated herein by reference, represents the state of the prior art with regard to devices that dispense solids and a liquid at the same time. While the patented invention is a quantum leap beyond the previous art, it has certain attributes that result in a less than perfect solution to the problems associated with dispensing solid and liquid materials from the same device.

One problem is that only a single liquid may be dispensed by the prior art devices. Many times it is useful to use multiple scents for different purposes. It would be useful, for example only, to dispense one liquid that attracts deer and one scent that masks the smell of a human. The prior art allows for only one scent to be dispersed at a time.

Another problem is that it is currently difficult to clean the liquid holder. A further problem is that the current liquid holders are an integrated part of the dispensing device and are subject to breaking due to exposure to the elements, such as when the liquid freezes. When the liquid holder of the prior art devices break, the entire device must be removed for repair.

Another problem is that the prior art liquid dispensers dispense liquid in a single attitude. The liquid either hits the solids or misses the solids but no correction or selection is enabled.

Wicks are known in the art and used in Applicant's prior patented device. A problem with the prior art wicks, however, is that they represent a continuous drain on the liquid when used.

Thus, there is a need in the art for providing a liquid and solids dispenser that dispenses more than one liquid, that is adjustable so that liquid may or may not be dispensed on the solids as desired, that is easy to use, fill and clean, that is resistant to breakage and that includes a wick that is not a continuous drain on the liquids.

SUMMARY OF THE INVENTION

Accordingly, the multiple liquid and solids dispenser apparatus and method of the present invention includes a solids dispenser for holding and dispensing solids. A liquid dispenser is connected to the solids dispenser and the liquid dispenser contains more than one liquid and is positionable so as to dispense the more than one liquid either on the solids or not on the solids.

According to another aspect of the invention, the liquid dispenser includes a liquid separator for keeping the more than one liquid separate from each other. In another aspect, the liquid dispenser is connected to the solid dispenser in the same horizontal plane as the solids dispenser. In a further aspect, the apparatus includes more than one liquid dispenser.

According to a further aspect of the invention, the liquid dispenser includes outlet orifices and outlet plugs. In another aspect, the liquid dispenser includes inlet flow meters and flow plugs. In another aspect, a wick is located so as to absorb at least one of the more than one liquid as it is dispensed from the liquid dispenser. In a further aspect, the solids dispenser includes a mixing ramp. In another aspect, the solids dispenser includes an agitator.

According to another embodiment of the invention, a multiple liquid and solids dispenser apparatus includes a solids dispenser for holding and dispensing solids where the solids dispenser includes a rotatable spinner plate for holding solids prior to rotation. More than one liquid dispensers are removably attached to the solids dispenser in the same horizontal plane as the rotatable spinner plate where the more than one liquid dispenser contains more than one liquid and is positionable so as to dispense the more than one liquid on the solids or not on the solids as desired. And a wick is located so as to absorb at least one of the more than one liquid as it is dispensed from the more than one liquid dispenser.

According to another aspect of the invention, the more than one liquid dispenser includes a liquid separator for keeping the more than one liquid separate. In another aspect, the more than one liquid dispenser includes outlet orifices and outlet plugs. In another aspect, the more than one liquid dispenser includes inlet flow meters and flow plugs. According to a further aspect, the spinner plate includes a mixing ramp. In a further aspect, the spinner plate includes an agitator.

According to another embodiment of the invention, a method of dispensing multiple liquids and solids includes providing a solids dispenser for holding and dispensing solids where the solids dispenser includes a rotatable spinner plate for holding solids prior to rotation. Adding solids to be dispensed to the spinner plate. Removably attaching more than one liquid dispenser to the solids dispenser in the same horizontal plane as the rotatable spinner plate. Adding more than one liquid to the more than one liquid dispenser. Positioning the more than one liquid dispenser so as to dispense the more than one liquid on the solids or not on the solids. Locating a wick so as to absorb at least one of the more than one liquid as it is dispensed from the more than one liquid dispenser and rotating the spinner plate so as to dispense the solids and the more than one liquid.

According to a further aspect of the invention, the method includes adding a liquid separator to the more than one liquid dispenser for keeping the more than one liquid separate within the more than one liquid dispenser. In another aspect, the method includes adding outlet orifices and outlet plugs to the more than one liquid dispenser. In a further aspect, the method includes adding flow meters and flow plugs to the more than one liquid dispenser. According to another aspect, the method includes adding a mixing ramp and an agitator to the spinner plate.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
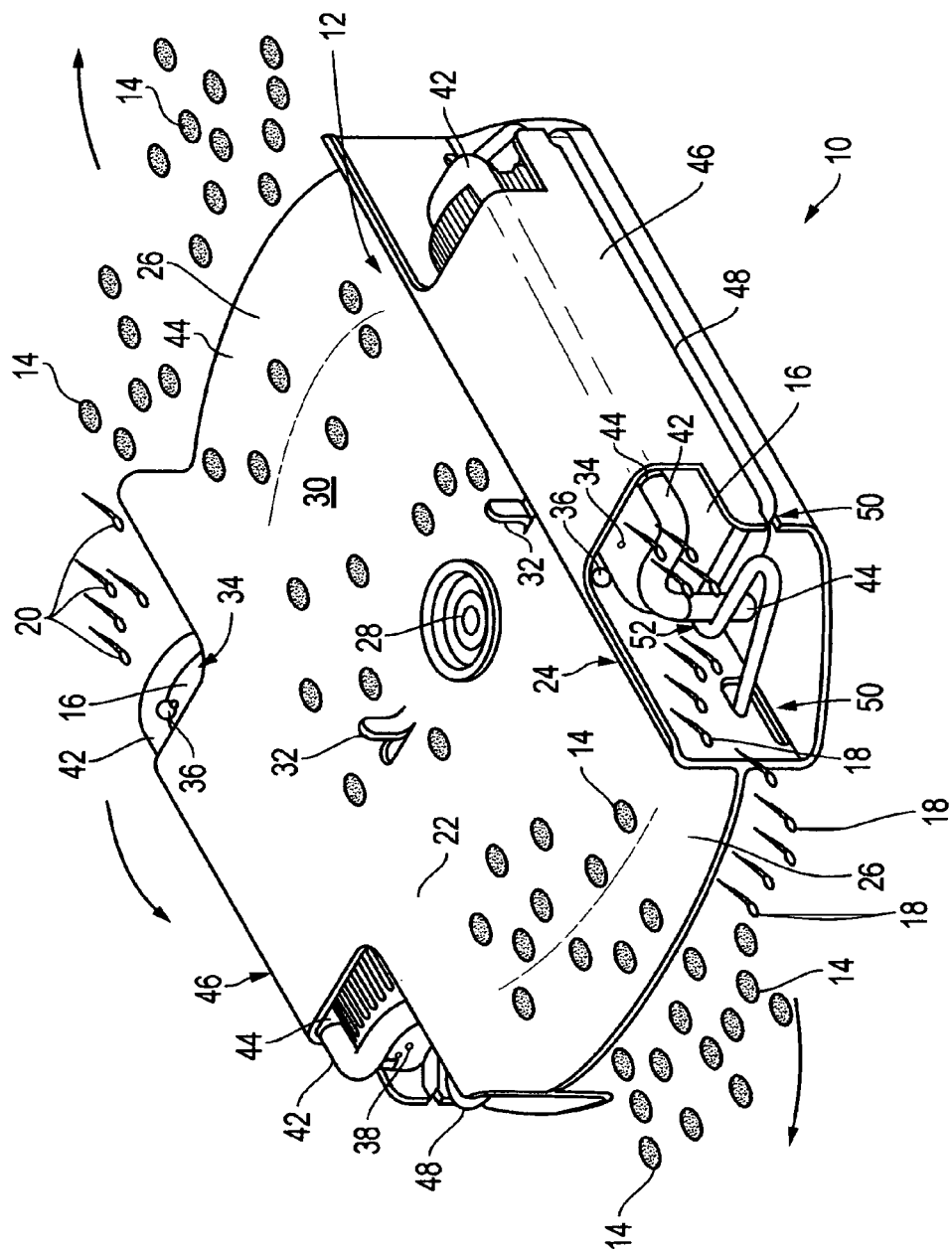
FIG. 1 is a perspective few of the multiple liquid and solids dispenser according to one embodiment of the present invention.
Figure 2:
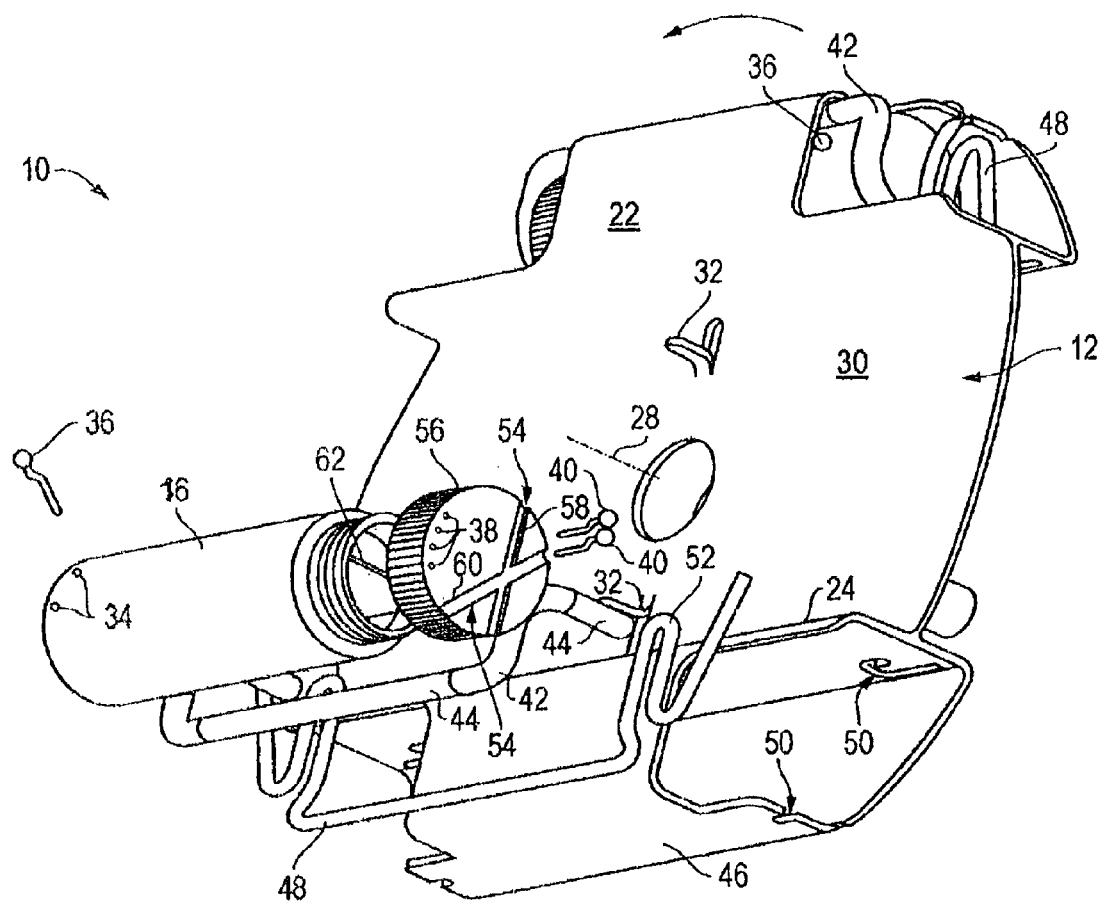
FIG. 2 is a partially exploded perspective view of the invention of FIG. 1, showing the details of the liquid dispenser and attachments.

The preferred embodiment of the present invention is illustrated by way of example in FIGS. 1-3. With specific reference to FIGS. 1 and 2, the multiple liquid and solids dispenser apparatus 10 of the present invention includes a solids dispenser 12 for dispensing solids 14. Liquid dispenser 16 is connected to the solids dispenser 12 for dispensing more than one liquid, liquid 18 and liquid 20.

As used herein the term "solids" is used in its ordinary sense and with its ordinary meaning to describe material that is not liquid or gas. In particular, as used herein, the term "solids" includes granular material or particulate material that is broadcast by a spinning plate in the form of solids dispenser 12 as described and illustrated herein. Thus, the term "solids" includes material such as food pellets, kernels of corn and the like.

As illustrated, solids dispenser 12 includes raised sides 22 and 24 and ramps 26. Ramps 26 are lower than raised sides 22 and 24 and provide the "openings" past which solids 14 are thrown as the solids dispenser 12 is rotated around its axis 28 as will be disclosed more completely hereafter. Ramps 26 serve two purposes. When the apparatus is at rest, 28 the ramps 26 in combination with raised sides 22 and 24 prevent solids 14 from spilling out. When the solids dispenser is rotated about axis 28, ramps 26 add lift to the solids 14 as they are thrown from the apparatus so that solids 14 are lifted higher and thrown farther and are mixed with the liquids 18 and 20.

In combination, sides 22 and 24 and ramps 26 create a spinner plate 30 upon which solids 14 rest and from which solids 14 are thrown when the spinner plate 30 is rotated about axis 28. Axis 28 is the location of whatever moving force the user desires. As shown in Applicant's U.S. Pat. No. 4,989,547 a motor and drive shafts (not shown) may be connected, as is known in the art, so as to rotate the solids dispenser 12 about the axis 28. This rotation creates the force necessary to "throw" the solids 14 from the spinner plate 30. Also, spinner plate 30 holds only a relatively small amount of solids 14. As is known and as shown in Applicant's U.S. Pat. No. 4,989, 547, a large container for holding large amounts of solids 14 may be located next to spinner plate 30 and dispense additional solids 14 as the spinner plate 30 rotates and throws solids 14.

FIGS. 1 and 2 also show agitator 32. Agitator 32 consists, according to one embodiment, of a pair of projections that are raised above the surface of spinner plate 30. Agitator 32 may be formed in any manner now known or hereafter developed including cutting a portion of spinner plate 30 and raising the cut portion as illustrated. Agitator 32, however created, separates solids 14 and prevents blockage as the spinner plate 30 is rotated so that solids 14 are broken apart before being thrown so as to intermix with one or more liquids 18 or 20 to enhance flavor or taste, for example only.

FIGS. 1 and 2 also show that, according to one embodiment, the invention includes more than one liquid dispenser 16 and that they are connected to the solids dispenser 12 at the same horizontal plane as the spinner plate 30. Further, liquid dispenser(s) 16 include outlet orifices 34, outlet plugs 36, inlet flow meters 38 and flow plugs 40, all as will be described more fully hereafter with regard to FIGS. 3 A-C. Nonetheless, as shown in FIG. 2, liquid dispenser 16 may include more than one outlet orifice 34, outlet plugs 36, inlet flow meters 38 and flow plugs 40.

According to one embodiment, the invention also includes a wick 42. Wick 42 is made of absorbent material of any sort now known or hereafter developed for absorbing liquids 18 and 20. Importantly, wick 42 is located in close proximity to liquid dispenser 16 but is not directly connected to liquid dispenser 16. As a result, wick 42 absorbs liquid 18 and/or 20 when the apparatus is rotated but wick 42 does not continuously draw liquid from liquid dispenser 16. Wick 42 includes, according to one aspect of the invention, a barrier sleeve 44 that does not allow liquid 18 or 20 to penetrate: Thus, barrier sleeve 44 prevents any adverse chemical reaction which may take place if the liquid 18 or 20 is allowed to touch the surface of the apparatus. Additionally, barrier sleeve 44 allows evaporation of liquids 18 or 20 only in the desired or designated areas where the wick 42 is exposed.

Still referring to FIGS. 1 and 2, according to one embodiment, raised sides 22 and 24 form one part of a liquid dispenser 16 container 46. Container 46 is formed so as to create an enclosure within which liquid dispenser 16 is removably attached to solids dispenser 12 and spinner plate 30. As illustrated, container 46 is open ended so that liquid dispenser(s) 16 may be easily inserted and removed in order to add more liquid 18 or 20 or for cleaning or replacement.

Liquid dispenser(s) 16 are held in place in container 46 by any means now known or hereafter developed such as by spring latch 48 as illustrated. Spring latch 48 cooperates with interlocks 50 in container 46 so as to hold spring latch 48 in place. Spring latch 48 includes a wick clamp section 52 for locking wick 42 in location near liquid dispenser 16 as illustrated.

Referring now to FIG. 2 only, an important feature of the present invention is shown in the form of locators 54 in cap 56 of liquid dispenser 16. Locators 54, according to one embodiment, are grooves in cap 56 that cooperate with spring latch 48 to hold liquid dispenser 16 in a particular location. If it is desired to hold liquid dispenser 16 in a position such that liquid 18 or 20 is dispensed in a helical upward and outward direction and therefore mixes with the solids 14 as the solids fall to the ground, the user places spring latch 48 into vertical projection groove 58. If, however, the user desires the liquids 18 or 20 to be dispensed onto wick 42 so that the liquid vapors linger in the air for a long period of time, the user places spring latch 48 into angled projection groove 60.

Finally, FIG. 2 shows that liquid dispenser 16, according to one embodiment, includes a liquid separator 62. Liquid separator 62 allows a user to fill a liquid dispenser 16 with two separate liquids, 18 and 20, in the same dispenser. Liquid dispenser 16 is preferably transparent or translucent such that fluid levels may be easily determined and is made of weather resistant plastic that does not crack or break when frozen or deteriorate in sunlight.

Referring now to FIGS. 3 A, B and C, the details of liquid dispenser(s) 16 are discussed. FIG. 3A is a partially exploded view of liquid dispenser 16 with cap 56 removed. Cap 56 may be attached to liquid dispenser 16 in any manner now known or hereafter developed such as by threaded attachment as shown. Dispenser 16 may also be a sealed dispenser without a cap 56 but still including outlet orifices 34, outlet plug 36, inlet flow meter 38, flow plug 40 and locators 54. This "sealed" dispenser 16 allows it to be easily manufactured and fully disposable when empty instead of being reusable.

Flow plugs 40 are shown in place in inlet flow meters 38. Flow plugs 40 are curved as illustrated to resist being thrown out of contact during rotation and include a bulbous top to prevent the plug from passing totally into the liquid dispenser 16.

Inlet flow meters 38 are holes in cap 56 which allow air to enter liquid dispenser 16 if flow plugs 40 are removed. Because more than one inlet flow meter 38 is provided, the rate and/or amount of liquid 18 or 20 dispensed is easily controlled by inserting or removing flow plugs 40. Multiple inlet flow meters 38 are provided in each section of the liquid dispenser 16 created by liquid separator 62.

Figure 3A:
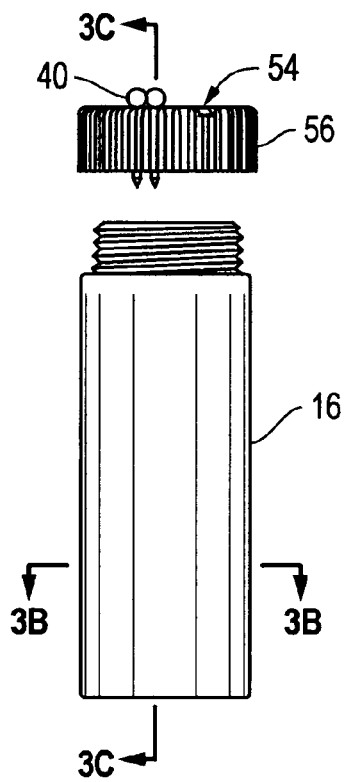
FIGS. 3 A-C are a side view, an end cross sectional view and a length-wise cross sectional view of the liquid dispenser of FIG. 1.
Figure 3B:
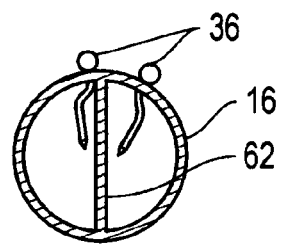

FIG. 3B is a cross section of FIG. 3A taken along lines 3B-3B and clearly shows liquid separator 62 as dividing liquid dispenser 16 approximately in half. Obviously, more than one liquid separator 62 may be used to create many separate compartments for containing various different liquids within a single liquid dispenser 16.

FIG. 3B also shows outlet plugs 36 used to plug outlet orifices 34 in the end of the liquid dispenser 16 farthest away from the cap 56. When outlet plugs 36 are in place, no liquid 18 or 20 may escape. This, of course, is very useful when filling liquid dispenser 16 prior to placing liquid dispenser 16 into container 46. Outlet plugs 36 have the same general form as flow plugs 40.

Figure 3C:
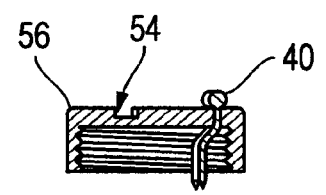
Figure 3C:
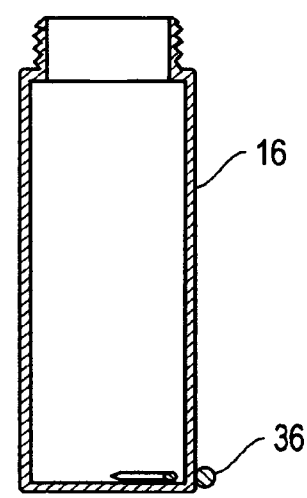

FIG. 3C is a cross section of FIG. 3A taken along lines 3C-3C and shows both the flow plugs 40 and the outlet plug 36 in place in liquid dispenser 16.

When two liquid dispensers 16 are provided, each with a single liquid separator 62, four separate and distinct fluids may be put to use at the same time. For example only and not by limitation, when the invention is used for deer hunting, the apparatus may be set up before the season in the following manner. Chamber #1 of a liquid dispenser 16 is filled with a scent enhancing liquid for shelled corn, for example. Many forms of scent and flavor enhancing liquids are commercially available and known in the art. Chamber #2 is filled with an apple flavor. Chamber #3 is filled with buck urine or a chemical equivalent which is an infringement scent used by bucks to establish territorial limits. Chamber #4 is filled with a human masking scent such as the chemical equivalent of fox or raccoon urine or any scent that the user would not mind applying to himself. Chamber #1 is directed to fall onto wick 42. This set up will attract deer from far away and quickly because of the sweet smells. The bucks will stay in the vicinity due to the buck infringement scent and over the next several days or weeks, the deer will become accustomed to the human masking scent so that when the hunter walks to the location with the same human masking scent applied, the deer will be less concerned about the human presence.

By way of another example, in early fall, Chamber #1 of a liquid dispenser 16 is filled with a flavor or scent enhancing liquid for shelled corn, for example. Chamber #2 is filled with an apple or vanilla flavor or scent. Chamber #3 is filled with a doe pheromone scent, such as Mate-Triks Doe-In-Heat scent manufactured by the Buck Stop Lure Co. of Michigan, to keep the bucks in the area. Chamber #4 is filled with the same human masking scent or any scent that the user would not mind applying to himself that was used prior to hunting season. The same masking scent should be used consistently so as to condition the deer to the same masking scent the hunter applies to himself. The liquids 18 or 20 may be olfactory attractants, food flavors, pheromones, medicine, water or any useful chemicals.

The advantages of Applicant's present invention are obvious. Multiple different liquids 18 or 20 or more may be distributed at the same time. Some on the food solids 14 and some on the wicks 42, as desired. The liquid dispenser 16 is easily filled, cleaned and adjusted for flow rates and direction. The user can easily determine how much liquid remains of each type of liquid and the liquid dispenser 16 is totally weather proof. The liquid dispensers 16 may be attended to without disturbing the solids dispenser 12. Also, it should be appreciated that Applicant's invention can be used as a deer deterrent device for applying liquid deer repellants to a garden or landscape.

Thus, while the present invention has been disclosed in connection with the preferred embodiment thereof, it should be understood that there may be other embodiments which fall within the spirit and scope of the invention as defined by the following claims.

What is claimed is:

1. A multiple liquid and solids dispenser apparatus including:
   a. a solids dispenser for holding and dispensing solids wherein said solids dispenser includes a rotatable spinner plate for holding solids prior to rotation;
   b. at least one liquid dispenser connected with said solids dispenser in a horizontal plane that is approximately the same as a horizontal plane of said rotatable spinner plate wherein said at least one liquid dispenser contains at least one liquid and wherein said at least one liquid dispenser is positionable such that said at least one liquid is dispensed either on said solids or not on said solids as said solids are dispensed wherein said at least one liquid dispenser includes outlet orifices and outlet plugs and wherein said at least one liquid dispenser includes inlet flow meters and flow plugs; and
   c. a wick located so as to absorb at least one of said at least one liquid as it is dispensed from said at least one liquid dispenser wherein said wick is not directly in contact with liquid in said at least one liquid dispenser.

2. The apparatus of claim 1 wherein said more than one liquid dispenser includes a liquid separator for keeping said more than one liquid separate.

3. The apparatus of claim 1 wherein said spinner plate includes opening with an elevated ramp.

4. The apparatus of claim 1 wherein said spinner plate includes an agitator.

5. A method of dispensing multiple liquids and solids including:
   a. providing a solids dispenser for holding and dispensing solids wherein said solids dispenser includes a rotatable spinner plate for holding solids prior to rotation;
   b. adding solids to be dispensed to said spinner plate;
   c. removably attaching more than one liquid dispenser to said solids dispenser in a horizontal plane that is approximately the same as a horizontal plane of said rotatable spinner plate;
   d. adding more than one liquid to said more than one liquid dispenser;
   e. positioning said more than one liquid dispenser such that said more than one liquid is dispensed either on said solids or not on said solids as said solids are dispensed;
   f. locating a wick so as to absorb at least one of said more than one liquid as it is dispensed from said more than one liquid dispenser wherein said wick is not directly in contact with liquid in said liquid dispenser; and
   g. rotating said spinner plate so as to dispense said solids and said more than one liquid.

6. The method of claim 5 further including adding a liquid separator to said more than one liquid dispenser for keeping said more than one liquid separate within said more than one liquid dispenser.

7. The method of claim 5 further including adding outlet orifices and outlet plugs to said more than one liquid dispenser.

8. The method of claim 5 further including adding flow meters and flow plugs to said more than one liquid dispenser.

9. The method of claim 5 further including adding a ramp and an agitator to said spinner plate.

* * * * *